US009508140B2

(12) United States Patent
Su et al.

(10) Patent No.: US 9,508,140 B2
(45) Date of Patent: Nov. 29, 2016

(54) QUANTIFYING CURVATURE OF BIOLOGICAL STRUCTURES FROM IMAGING DATA

(71) Applicants: Agency for Science, Technology and Research, Singapore (SG); Singapore Health Services Pte Ltd, Singapore (SG)

(72) Inventors: Yi Su, Singapore (SG); Chi Wan Calvin Lim, Singapore (SG); Ru San Tan, Singapore (SG); Liang Zhong, Singapore (SG)

(73) Assignees: Agency for Science, Technology and Research, Singapore (SG); Singapore Health Services Pte Ltd, Singapore (SG)

( * ) Notice: Subject to any disclaimer, the term of this patent is extended or adjusted under 35 U.S.C. 154(b) by 0 days.

(21) Appl. No.: 14/011,695

(22) Filed: Aug. 27, 2013

(65) Prior Publication Data

US 2014/0064588 A1    Mar. 6, 2014

(30) Foreign Application Priority Data

Aug. 27, 2012  (SG) .................................. 201206354
Aug. 27, 2012  (SG) .................................. 201206357

(51) Int. Cl.
*G06T 7/00* (2006.01)
*G06T 7/60* (2006.01)

(52) U.S. Cl.
CPC .......... *G06T 7/0012* (2013.01); *G06T 7/0014* (2013.01); *G06T 7/604* (2013.01); *G06T 2200/04* (2013.01); *G06T 2207/10088* (2013.01); *G06T 2207/30048* (2013.01)

(58) Field of Classification Search
None
See application file for complete search history.

(56) References Cited

U.S. PATENT DOCUMENTS 6,236,738 B1 *   5/2001   Zhu et al. ..................... 382/107
6,757,423 B1 *   6/2004   Amini ........................... 382/154
6,816,607 B2 *  11/2004   O'Donnell et al. .......... 382/131
7,041,061 B2     5/2006   Kramer et al.

(Continued)

FOREIGN PATENT DOCUMENTS

WO    WO 01/16886 A2    3/2001

OTHER PUBLICATIONS de Boer et al. "Mesh deformation based on radial basis function interpolation," published in 2007.*

(Continued)

*Primary Examiner* — Vu Le
*Assistant Examiner* — Alexander J Lesnick
(74) *Attorney, Agent, or Firm* — Blakely, Sokoloff, Taylor & Zafman LLP

(57) ABSTRACT

A method and system are proposed to obtain quantitative data about the shape of a biological structure, and especially a heart ventricle. A set of three-dimensional input meshes are generated from MRI data. They represent the shape of a ventricle at successive times. The input meshes are used to generate a set of three-dimensional morphed meshes which have the same number of vertices as each other, and have respective shapes which are the shapes of corresponding ones of the input meshes. Then, for each of the times, shape analysis is performed to obtain a curvedness value at each of a plurality of corresponding locations in the morphed meshes. The curvedness value may be used to obtain a curvedness rate at each of the locations, indicative of the rate of change of curvedness with time at each of the locations.

15 Claims, 11 Drawing Sheets

(56) References Cited

U.S. PATENT DOCUMENTS

| | | | |
|---|---|---|---|
| 7,421,101 B2 | 9/2008 | Georgescu et al. | |
| 7,620,447 B2 | 11/2009 | Harel et al. | |
| 8,107,703 B2* | 1/2012 | Shekhar et al. | 382/128 |
| 2007/0161894 A1 | 7/2007 | Zdeblick et al. | |
| 2008/0260230 A1 | 10/2008 | Gotardo et al. | |
| 2012/0002840 A1* | 1/2012 | Linnenbank et al. | 382/103 |

OTHER PUBLICATIONS

Park et al. "A Finite Element Model for Functional Analysis of 4D Cardiac-Tagged MR Images," published in 2003.*

Rosato's "Applying Conformal Mapping to the Vertex Correspondence Problem for 3D Face Models," published in 2007, hereafter referred to as Rosato.*

Johan Montagnat, et al., "4D Deformable Models with Temporal Constraints: Application to 4D Cardiac Image Segmentation", Medical Image Analysis, vol. 9, No. 1, pp. 87-100, (2005).

Si Yong Yeo, et al., "A Curvature-Based Approach for Left Ventricular Shape Analysis from Cardiac Magnetic Resonance Imaging", Med. Biol. Eng. Comput., vol. 47, pp. 313-322, (2009).

Yi Su, et al., "A Geometrical Approach for Evaluating Left Ventricular Remodeling in Myocardial Infarct Patients", Computer Methods and Programs in Biomedicine, vol. 108, pp. 500-510, (2012).

* cited by examiner (a)          (b)

Local curvedness at end-diastole      Regional curvedness at end-diastole

Local curvedness at end-systole      Regional curvedness at end-systole (c)          (d)

QUANTIFYING CURVATURE OF BIOLOGICAL STRUCTURES FROM IMAGING DATA

FIELD OF THE INVENTION

The present invention relates to computer systems, and computerized methods, for using image data such as Magnetic Resonance Imaging (MRI) data, to measure changes in the curvature of a biological structure, such as a heart ventricle, and in particular the left ventricle (LV) of a subject's heart.

BACKGROUND OF THE INVENTION

Ventricular remodeling is defined as changes in size, shape and function of the heart after cardiac injury (i.e., acute myocardial infarction). Adverse ventricular remodeling leads to development of heart failure (HF). Accurate quantitative assessment of ventricular remodeling (i.e., shape and shape deformation) is instrumental both for diagnosis and prognosis and to follow the effectiveness of therapeutic interventions.

Conventionally, many techniques used in actual clinical settings are based on two-dimensional (2D) left ventricle (LV) contours, such as sphericity index and subsequently conicity index. These methods lack specificity and only describe limited aspects of the LV. To achieve regional quantification of LV shape parameters, it has been proposed to use curvature analysis on ventricular outlines. While this concept applies to 2D curves, a more recent proposal is to using Gaussian curvature as a descriptor of regional LV geometry. Other researchers have measured regional LV shape deformation by comparing three-dimensional (3D) subject-specific models of LV with a baseline surface with respect to some distance functions. Other more sophisticated methods aim to analyze LV shape and motion based on volumetric deformable models. More recently, an image analysis technique based on principal component analysis has been used to assess regional ventricular shape.

Nevertheless, there is still a lack of an efficient and clinically meaningful way to capture and quantify complex 3D LV conformational data.

SUMMARY OF THE INVENTION

The present invention aims to provide a method for assessing ventricular 3-dimensional (3D) shape, and in particular a method which does this in terms of curvedness and shape deformation and/or in terms of curvedness rate (defined as the rate of change of curvedness). The method may be performed on data generated using magnetic resonance imaging (MRI) in a semi-automated, fast and user friendly fashion.

In general terms, the present invention proposes that a set of three-dimensional input meshes which represent the shape of a ventricle (or another biological structure; preferably the structure is one having a periodic motion, another example being a subject's lungs) at successive times are used to generate a set of three-dimensional morphed meshes. The morphed meshes have respective shapes which are the shapes of corresponding ones of the input meshes. Then, for each of the times, three-dimensional shape analysis is performed to obtain a curvedness value at each of a plurality of corresponding locations in the morphed meshes.

Preferably, the morphed meshes have the same number of vertices as each other (that is, there is a 1-to-1 4D mesh). An advantage of this is that the mean value is more accurate as the sampling is consistent throughout the whole cardiac cycle, and it allows a very convenient way to compare (or integrate) the curvedness rate results with other indices (especially functional indices) which require such correspondence, such strain map and acceleration map.

The curvedness value may be used to obtain a curvedness rate at each of the locations, indicative of the rate of change of curvedness with time at each of the locations.

Preferably, the step of forming the morphed meshes uses one of the input meshes (e.g. the input mesh for the first or last of the successive times) as a generic mesh, and for each of the other input meshes forms the corresponding morphed mesh by deforming the generic mesh to the shape of the other input mesh. The deformation of the generic mesh can be performed using a radial basis function (RBF) morphing, with progressive projection and smoothing.

The input meshes may be produced from border delineated ventricular contours obtained from MRI data.

The present invention makes it possible to generate data characterizing curvedness and/or curvedness rate (i.e. rate of change of curvedness), to provide a physician, radiologist, or cardiologist with information about current ventricular performance and the effects of pharmacologic therapies in patients with heart disease. Curvedness is a valuable measure of ventricular shape and curvedness rate is a valuable measure of ventricular shape deformation.

The shape analysis may be performed by fitting quadric surfaces over the vertices of the generic mesh and each morphed mesh, and computing geometrical parameters such as principal curvatures and their variants (Gaussian, Mean, Curvedness).

The shape analysis may be done locally (i.e., at each point of the mesh) and then aggregated over for each of the multiple regions of the ventricle. Each region contains multiple ones of the vertices. For each region, the corresponding portion of each of the input meshes (or their corresponding morphed meshes) is determined. This may be done using landmarks common to the input meshes. For example, we can use 16 regions of the left ventricle (LV), consistent with published clinical nomenclature.

Using the regional curvedness rate, a first time derivative of curvedness (dC/dt), may be computed for each region.

By means of embodiments of the invention current methods for assessing ventricular shape and shape deformation can be easily implemented in a clinical environment. The measures of curvedness and curvedness rate are useful clinical indicators for ventricular remodeling quantification in patients with diverse heart disease.

With advancements in magnetic resonance imaging (MRI), LV surface curvature can be quantified noninvasively by means of the embodiment substantially throughout the LV. In addition, we have discovered that regional surface curvedness is closely related to ventricular wall stress, and that patients with ischemic dilated cardiomyopathy exhibited more homogeneous curvedness throughout the LV compared to the normal heart.

Experimentally, we have established that our method is resilient to human-induced variations by proper selection of the neighborhood for the surface fitting, specifically to be at least about 5% of the total area of the endocardial surface. In addition, the mesh partitioning method is invariant with regards to the mesh topology to ensure repeatability if the mesh generation technique is modified. From a clinical perspective, we have shown that this method can be employed to study and quantitate LV remodeling, as well as a post-surgical tool to examine the effect of surgical ventricular restoration on a cohort of HF patients.

The utility of embodiments of the present invention goes beyond these clinical applications: by extending our method from an instantaneous quantification of shape parameter (i.e., curvedness) to its time-derivatives (i.e., curvedness rate), we can effectively perform regional quantification of dynamic cardiac performance. This further expands the utilization possibility of our method to more clinical applications, such as pre-surgical assessment of patient suitability of cardiac resynchronization therapy.

The term "mesh" is used here to mean a set of points (vertices) in a three-dimensional space, and faces having corners which are ones of the points. The method defines a two-dimensional surface (usually not a flat surface) embedded in the three-dimensional space.

BRIEF DESCRIPTION OF THE DRAWINGS

An embodiment of the invention will now be described for the sake of example only with reference to the following drawings, in which.

DETAILED DESCRIPTION OF THE EMBODIMENT

Figure 1:
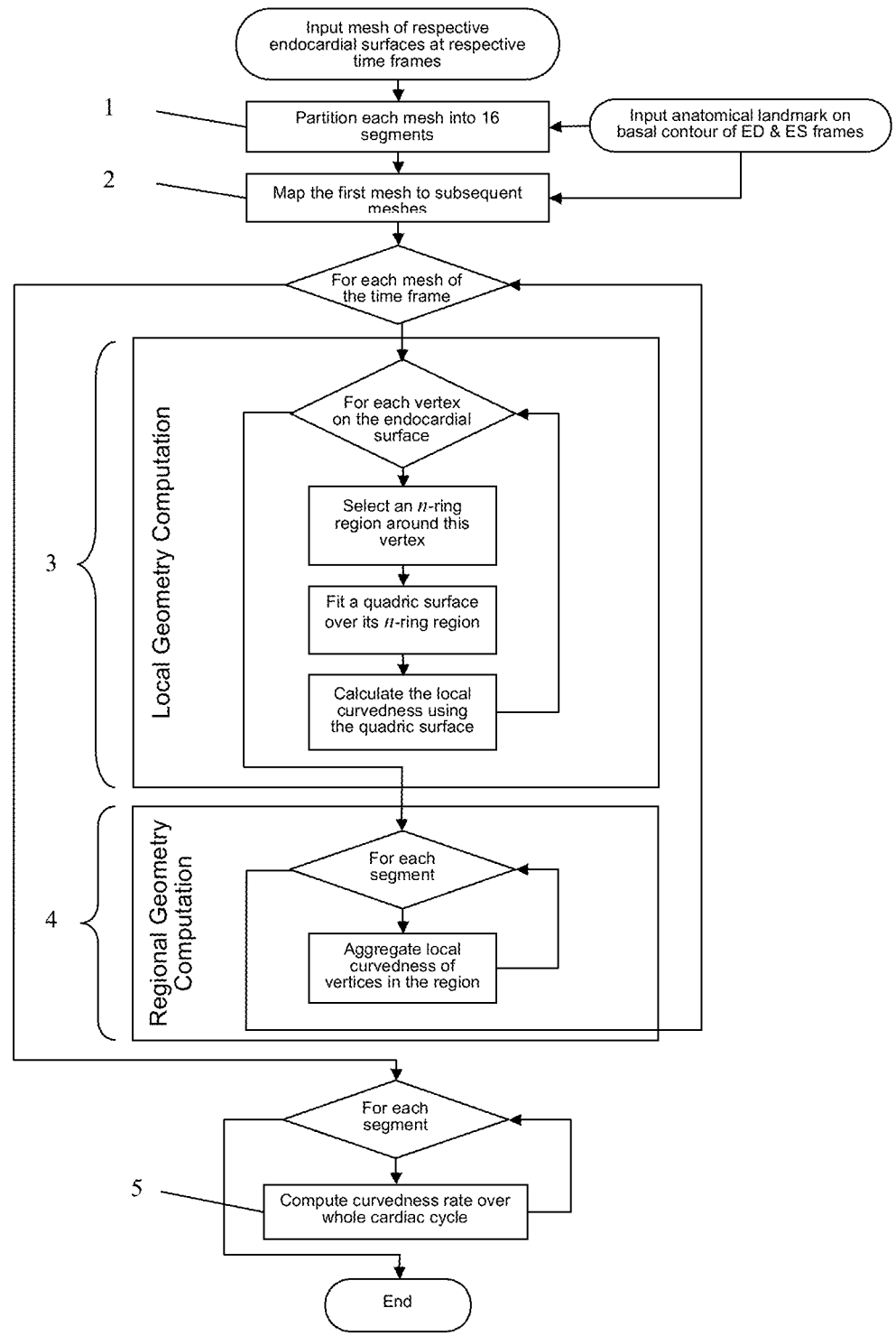
FIG. 1 is a flow diagram of an embodiment of the invention.

Referring firstly to FIG. 1, a method which is an embodiment of the invention is illustrated as a flow diagram. The method may be performed by a computer system, such as a standard generally programmed computer, having a data storage device storing program instructions to implement the method steps. The workflow performs very fast (in human terms, substantially instantaneous) shape quantitation.

Figure 4:
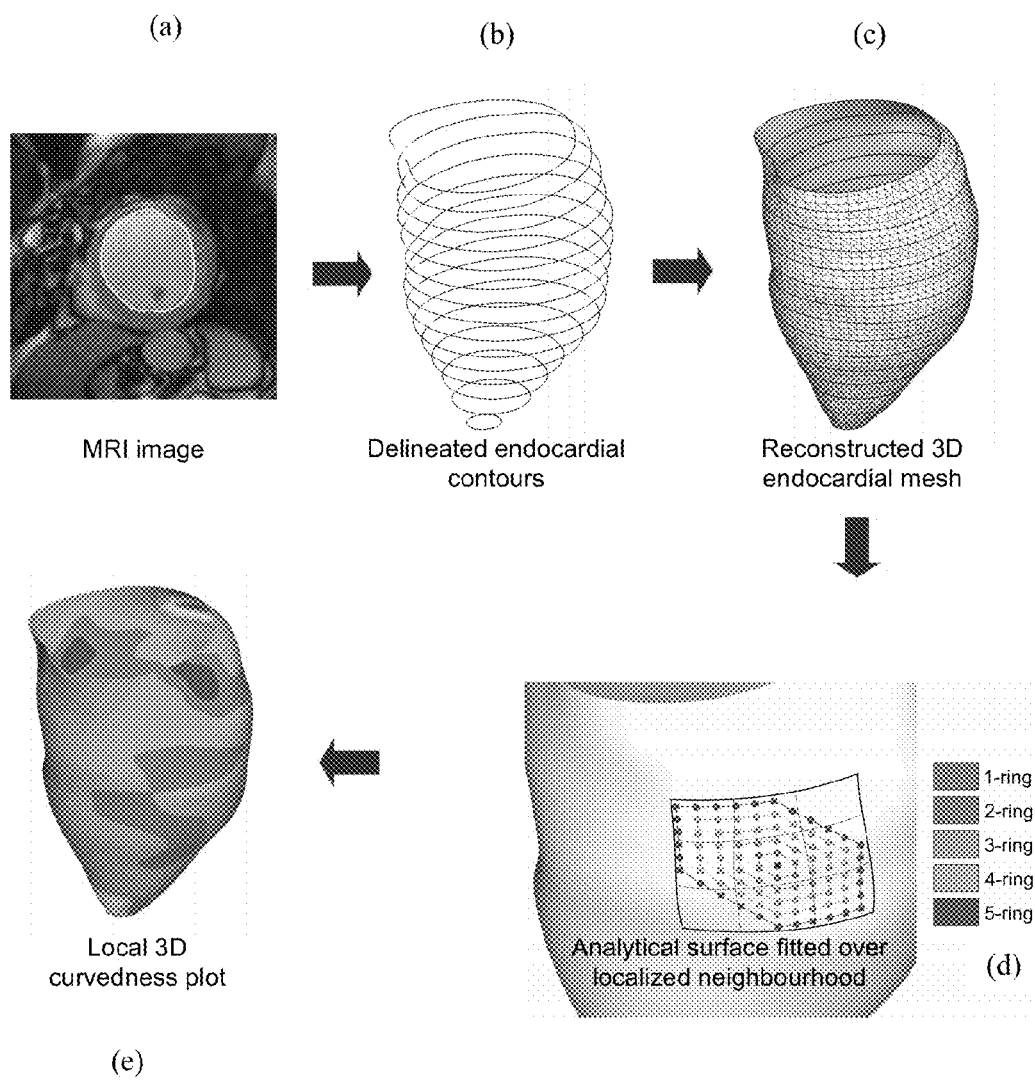
FIG. 4, which is composed of FIGS. 4(*a*) to 4(*e*), illustrates surface fitting and curvedness computation.

There are Two Inputs to the System:

(i) a set of surface meshes representing the instantaneous shape of the endocardial surface of the left ventricle (LV) at each of a set of respective instants ("time frames"). These surface meshes are derived from MRI data captured at the respective times. There are many existing ways of generating the input meshes. To illustrate, FIG. 4(*a*) shows the MRI data for a given instant. FIG. 4(*b*) shows delineated contours produced from the MRI data. FIG. 4(*c*) shows the mesh for the corresponding instant, which is the input to the embodiment.

(ii) for each mesh, data indicating the corresponding position in the MRI data of an anatomical landmark. This landmark may be chosen as one on the basal contour of the MRI data, such as the attachment point of the right ventricle (RV) to the LV. Preferably, the landmark is specified manually by the user in the ED and ES frames. The landmark in the remaining frames is automatically generated using a cubic order interpolation method.

In step 1 of FIG. 1, the LV mesh at each respective instant (or time frame) is partitioned into 16 segments based on a standardized nomenclature.

In step 2, the mesh representing the first frame of the cardiac cycle is used as a template (source mesh) and is mapped to the subsequent frames of the cardiac cycle. The mapping is performed using a radial basis function (RBF) approach with progressive projection coupled with local smoothing to ensure robustness. The source RBF feature points are selected by utilizing landmarks derived from the partitioning of the mesh of the first frame; the corresponding RBF target feature points are selected by utilizing landmarks derived from the partitioning of the mesh of the frame to be mapped to. Using this approach, we generate a 4D dynamic mesh model of the LV with 1-to-1 point correspondence at every time frame. Note that another way of generating a one-to-one mapping is provided in Montagnat, H. Delingette, "4D deformable models with temporal constraints, application to 4D cardiac image segmentation", Medical Image Analysis, 9, 1 (2005) p 87-100.

Shape analysis is performed in two main stages (steps 3 and 4). First there is a local geometry computation step 3. The geometry over localized regions of the mesh is approximated by using a quadric fitting approach. Based on the fitted quadric, the local curvedness is computed. In a regional geometry computation step 4, the regional curvedness value of each segment is calculated by aggregating the local curvedness values of the points contained in each region. In step 5, the curvedness rate is calculated.

Each of steps 1-5 will now be explained in more detail in the following sections.

1. Partitioning of Each Input Mesh into Regional Segments

There are two purposes in performing mesh partitioning: (1) to generate landmarks for RBF morphing, and (2) to quantitate Regional Curvedness of the LV endocardial surface. The partitioning is based on a published nomenclature by the American Heart Association. We have extended this nomenclature for 3D partitioning of the endocardial surface mesh. The adoption of such a nomenclature allows us to achieve adequate sampling of the LV without exceeding the relevant limits for clinical and research purposes. As the apex of the LV is below the bottom-most apical short-axis slice, it is difficult to determine its actual location. Therefore, Region 17 in the published nomenclature is completely excluded from consideration.

Figure 2:
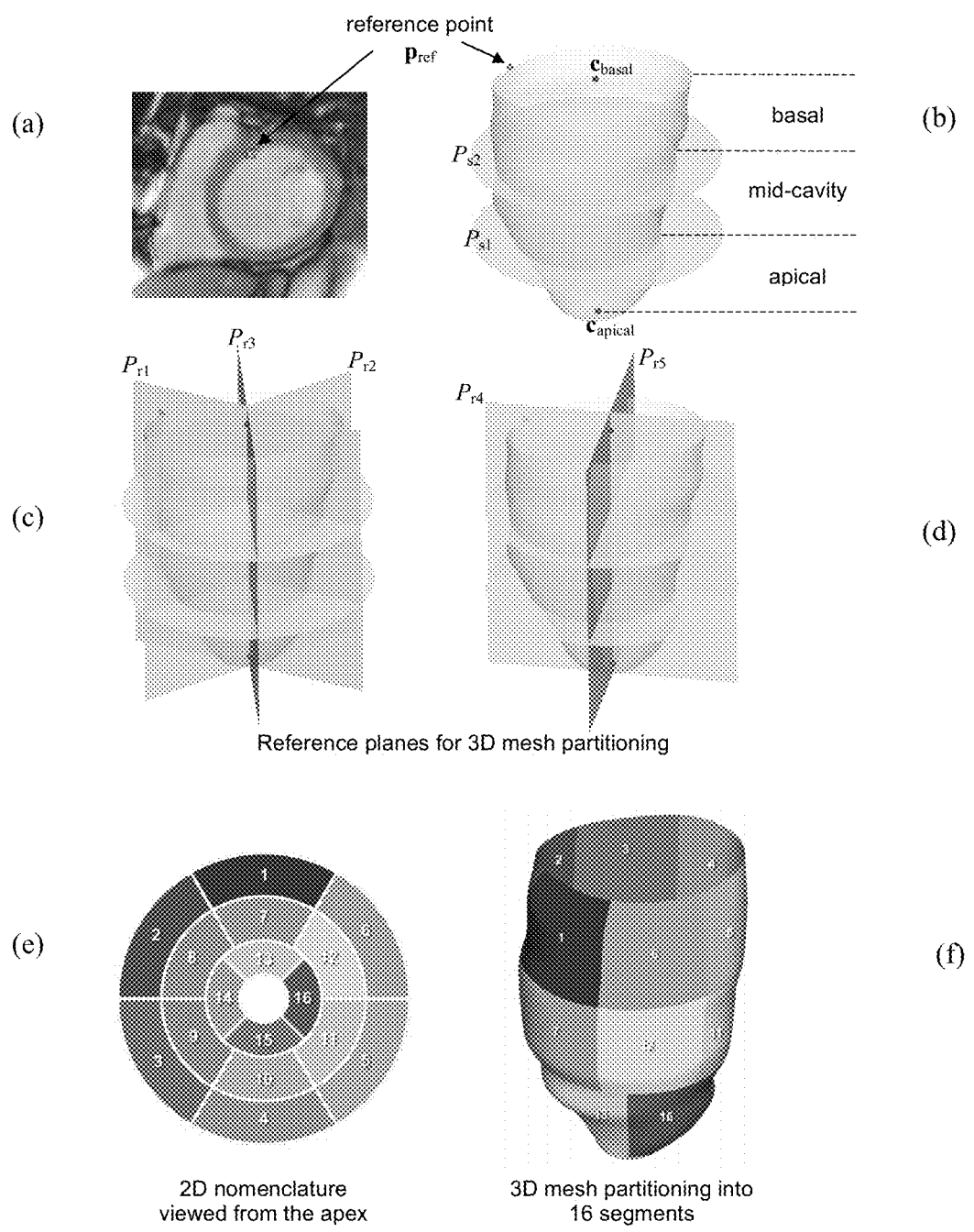
FIG. 2, which is composed of FIGS. 2(*a*) to 2(*f*), illustrates the partitioning of a LV method into sixteen segments in the embodiment of FIG. 1.

To define the segments, a user-defined anatomical landmark $p_{ref}$ on the basal contour is used as the input. The point $P_{ref}$ is identified as the attachment of the right ventricle to the left ventricle, as shown in FIGS. 2(a) and 2(b). An axis a is then defined, such that $a=c_{basal}-c_{apical}$, where $c_{basal}$ and $c_{apical}$ are the centroid locations of the basal and apical contours, respectively. $c_{basal}$ and $c_{apical}$ may be computed automatically by known methods. In the following explanation the axis a is regarded as the "vertical" direction.

Next, two horizontal planes $P_{s1}$ and $P_{s2}$ are defined to segregate the left ventricle into the three regions in the long axis, namely, the basal, mid-cavity and apical regions, as shown in FIG. 2(b). The plane $P_{s1}$ is defined such that its normal is in the direction of a and passing through the point one-third along the length of a while the plane $P_{s2}$ has the same normal direction but passes through the point two-thirds along the length of a.

In order to generate the circumferential regions, five additional radial planes are generated, as shown in FIGS. 2(c) and (d). The first radial plane $P_{r1}$ is defined as the plane passing through $c_{basal}$, $c_{apical}$ and $p_{ref}$. The normal of $P_{r1}$ is in the direction of $a \times (p_{ref}-c_{apical})$. The radial planes $P_{r2}$, $P_{r3}$, $P_{r4}$ and $P_{r5}$ are generated by rotating $P_{r1}$ about a by 60°, 120°, 15° and 105°, respectively. The circumferential regions in the basal and mid-cavity locations are defined with respect to $P_{r1}$, $P_{r2}$ and $P_{r3}$ while those in the apical locations are defined with respect to $P_{r4}$ and $P_{r5}$.

The resulting partitioning of the LV is illustrated in FIG. 2(e), in which each of the regions is represented as a respective arc, and the arcs are located with a distance from the centre of FIG. 2(e) which corresponds to the distance of the corresponding region from $C_{basal}$. The same partitioning is also illustrated in FIG. 2(f).

The vertices $v_i$ in each input mesh are then sorted into to the regions by following the following heuristics:

```
IF ( v is on +ve side of P_s2 )
    IF ( v is on +ve side of P_r1 AND v is on -ve side of P_r2 )
        v is in the basal anteroseptal region
    ELSE IF ( v is on +ve side of P_r2 AND v is on -ve side of P_r3 )
        v is in the basal inferoseptal region
    ELSE IF ( v is on +ve side of P_r3 AND v is on +ve side of P_r1 )
        v is in the basal inferior region
    ELSE IF ( v is on +ve side of P_r2 AND v is on -ve side of P_r1 )
        v is in the basal inferolateral region
    ELSE IF ( v is on -ve side of P_r2 AND v is on +ve side of P_r3 )
        v is in the basal anterolateral region
    ELSE IF ( v is on -ve side of P_r3 AND v is on -ve side of P_r1 )
        v is in the basal anterior region
    END IF
ELSE IF ( v is on -ve side of P_s2 and v is on +ve side of P_s1 )
    IF ( v is on +ve side of P_r1 AND v is on -ve side of P_r2 )
        v is in the mid anteroseptal region
    ELSE IF ( v is on +ve side of P_r2 AND v is on -ve side of P_r3 )
        v is in the mid inferoseptal region
    ELSE IF ( v is on +ve side of P_r3 AND v is on +ve side of P_r1 )
        v is in the mid inferior region
    ELSE IF ( v is on +ve side of P_r2 AND v is on -ve side of P_r1 )
        v is in the mid inferolateral region
    ELSE IF ( v is on -ve side of P_r2 AND v is on +ve side of P_r3 )
        v is in the mid anterolateral region
    ELSE IF ( v is on -ve side of P_r3 AND v is on -ve side of P_r1 )
        v is in the mid anterior region
    END IF
ELSE IF ( v is on -ve side of P_s1 )
    IF ( v is on +ve side of P_r4 AND v is on -ve side of P_r5 )
        v is in the apical septal region
    ELSE IF ( v is on +ve side of P_r5 AND v is on +ve side of P_r4 )
        v is in the apical inferior region
    ELSE IF ( v is on -ve side of P_r4 AND v is on +ve side of P_r5 )
        v is in the apical lateral region
    ELSE IF ( v is on -ve side of P_r4 AND v is on -ve side of P_r5 )
        v is in the apical anterior region
    END IF
END IF
```

Landmarks are extracted from each segment by selecting points on specific parametric positions on the patch of the input mesh corresponding to each segment. These form the set of feature points used for the RBF morphing. Note that the number of feature points is the same for each of the input meshes, even though the number of vertices each input mesh is typically different.

2. RBF Morphing

In this step, a mapping is formed between pairs of the input meshes. Specifically, the mesh representing the first frame of the cardiac cycle is used as a template ("source mesh") and is mapped successively to each of the subsequent frames of the cardiac cycle, which are regarded as successive "target meshes". Note that in variations of the method, another of the input meshes (frames) could be used as the source mesh. Alternatively, a source mesh which is a suitable geometric primitive, e.g. a cylinder or an ellipsoid, could be used.

Given two sets of n corresponding feature points $S=\{p_i\} \subset \mathbb{R}^3$ and $T=\{q_i\} \subset \mathbb{R}^3$ (i=1, ..., n) that lie on the source mesh $_s$ and the target mesh $_T$, respectively, we need to determine a function f: $\mathbb{R}^3 \to \mathbb{R}^3$ such that $$q_i = f(p_i) + p_i \quad i=1, \ldots, n \quad (1)$$

Radial Basis Functions (RBFs) are a popular means for interpolating scattered data for their ability to deal with irregular sets of data in multi-dimensional space in approximating high dimensional smooth surfaces. In our case, the interpolant using RBFs is a function that returns the displacement value for each non-feature vertices of $_s$ that takes it from the original position to its position in the target form. The displacements u=q-p are known for the source feature points $p_i$ and the target feature points $q_i$. These displacements are utilized to construct the interpolating function f(v) that returns the displacement for each generic mesh vertex v. Such a mapping can be expressed by a weighted linear combination of n basic functions defined by the source feature points and an additional explicit affine transformation:

$$f(v) = \sum_{i=1}^{n} c_i \phi(\|v-p_i\|) + Rv + t \quad (2)$$

where $v \in \mathbb{R}^3$ is a vertex of $_s$, $c_i \in \mathbb{R}^3$ are (unknown) weights, $\phi$ is the radial basis function which is a real valued function on [0,1), $\|\cdot\|$ denotes the Euclidean norm, $R \in \mathbb{R}^{3 \times 3}$ adds rotation, skew, and scaling, and $t \in \mathbb{R}^3$ is a translation component.

The function $\phi$ is defined by the source feature points. Popular choices for RBFs include the thin-plate spline $\phi(r)=r^2 \log(r)$, the Gaussian $\phi(r)=\exp(-\rho r^2)$, the multi-quadric $\phi(r)=\sqrt{r^2+\rho^2}$, and the biharmonic $\phi(r)=r$. In our experimental implementation of the embodiment, we used the multi-quadric function, which places no restrictions on the locations of the feature points. This function is defined as:

$$\phi(r_i) = \sqrt{r_i^2 + \rho_i^2} \quad (3)$$

where $r_i$ is the distance function from the source feature point $p_i$, and $\rho_i$ is the stiffness radius controlling the stiffness of the deformation around $p_i$. The value of $\rho_i$ is determined as the Euclidean distance to the nearest other source feature point:

$$\rho = \min_{\ne j} \|p_j - p_i\| i, j = 1, \ldots, n \tag{4}$$

Setting up a system of linear equations relating source and target feature points, the unknowns $c_i$, R, and t can be solved for simultaneously. The interpolation conditions of Eq. (1) lead to a linear system of n equations:

$$f(p_i) = q_i - p_i = u_i \; i = 1, \ldots, n \tag{5}$$

To remove affine contributions from the weighted sum of the basic functions, we include the additional constraints $$\Sigma_{i=1}^n c_i = 0, \Sigma_{i=1}^n c_i^T p_i = 0 \tag{6}$$

The linear system of Eqs. (5) and (6) can be conveniently represented in a matrix form. We first construct three matrices:

$$\Phi = \begin{pmatrix} \phi(p_1 - p_1) & \cdots & \phi(p_1 - p_n) \\ \vdots & \ddots & \vdots \\ \phi(p_n - p_1) & \cdots & \phi(p_n - p_n) \end{pmatrix} \in \mathbb{R}^{n \times n},$$

$$P = \begin{pmatrix} p_1^T & 1 \\ \vdots & \vdots \\ p_n^T & 1 \end{pmatrix} \in \mathbb{R}^{n \times 4},$$

$$B = (u_1 \; \ldots \; u_n \; 0 \; 0 \; 0 \; 0)^T \in \mathbb{R}^{(n+4) \times 3}.$$

Next, we set up a linear system of the form AX=B with $$A = \begin{pmatrix} \Phi & P \\ P^T & 0 \end{pmatrix} \in \mathbb{R}^{(n+4) \times (n+4)},$$

$$X = (c_1 \; \ldots \; c_n \; R \; T)^T \in \mathbb{R}^{(n+4) \times 3}.$$

This linear system can be solved using a standard LU decomposition with pivoting. Using the predefined interpolating function as given in Eq. (2), we calculate the displacement vectors for all vertices of $_s$ to obtain the deformed shape of the generic mesh.

Figure 3:
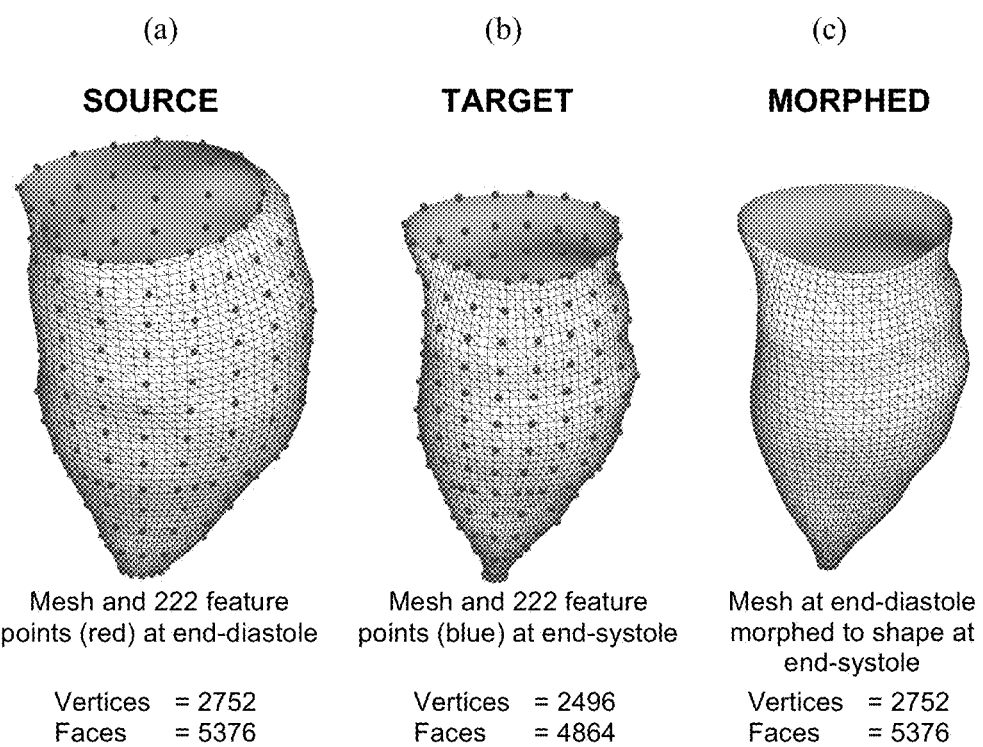
FIG. 3, which is composed of FIGS. 3(*a*) to 3(*c*), illustrates an RBF morphing step of the embodiment, driven by feature points extracted at end-diastole and end-systole.

FIG. 3 illustrates a RBF morphing produced by the embodiment between meshes at the ED and ES phases. FIG. 3(a) shows the source mesh, which is the input mesh corresponding to the moment which is at the end of the diastole (ED) (the diastole is period during which the LV fills with blood). The source mesh has 2752 vertices, defining 5376 faces, and step 1 of the embodiment has defined 222 feature points (landmarks) on it. FIG. 3(b) shows a target mesh, specially the input mesh corresponding to the moment which is at the end of the systole (ES) (the systole is the period during which the LV contracts). This target mesh consists of 2496 vertices, defining 4864 faces. Again, step 1 of the embodiment has defined 222 feature points on this mesh.

FIG. 3(c) shows how step 2 of the embodiment has used the feature points of the source mesh and target mesh to produce a morphed mesh. The step has morphed the source mesh to the shape of the target mesh, without changing the number of mesh points (2752 in this example) in the source mesh, or the number of vertices (5376 in this example) in the source mesh. Note that the connectivity of the morphed mesh is the same as that of the source mesh.

3 Local and Regional Curvedness Computation

To quantify LV remodeling, we utilize a measure known as the Local Curvedness. This is essentially a shape descriptor used to quantitate how curved the surface is in the vicinity of a point on the LV endocardial surface. For each instant, the embodiment uses the 3D mesh of the LV endocardial surface as a basis, and each vertex of the mesh is processed by fitting a quadric surface over a local region around the vertex. The mathematical basis for such an approach has been well studied and detailed expositions have been made. Here, we outline the key components of this process to provide the necessary backdrop for computational implementation, as schematically shown in FIGS. 4(d) and (e).

The aim of the surface-fitting process is to compute an extended quadric of the form $$z = ax^2 + bxy + cy^2 + dx + ey \tag{7}$$

which approximates the local three-dimensional geometry in the vicinity of a point p on a 3D mesh model. The procedure is as follows:

(1) Surface normal estimation. To estimate the direction of the surface normal n at point p, we use a method which can cater for the difference in size of the mesh faces. This provides flexibility to use irregularly or adaptively sampled meshes for representing the LV endocardial surface.

(2) Neighborhood selection. To provide a sample of points representing the underlying surface about p, a set of neighboring points is selected. This set consists of at least five points. While a 2-ring neighborhood will suffice for computation purposes, the choice of the neighborhood can affect the accuracy of the computation. We have found that an optimal n-ring that ensures noise invariance is approximately 5% of the total area of the endocardial surface mesh.

(3) Coordination transformation. As the quadric equation is expressed in its local coordinate system (x', y', z'), a transformation matrix R=[x', y', z'] needs to be constructed to map the neighborhood points to the local coordinate frame of the quadric. A feasible approach is to align the z'-axis in the direction of the estimated surface normal n. To fix the x'-axis, the global x-axis is projected onto the tangent plane defined by z'. However, in the degenerate case where the global x-axis is aligned with z', we use the global y-axis to define x'. Next, the y'-axis is simply y'=z'×x'. After R is determined, the coordinates of the neighborhood point $q_i$ are then mapped to the local coordinate frame using $$q_i' = R(q_i - p) \tag{8}$$

where $q_i'$ is the coordinates of the neighborhood point $q_i$ with respect to the local coordinate system.

(4) Quadric coefficients recovery. To recover the coefficients {a, b, c, d, e} of the quadric in Eq. (7), we solve the associated system of linear equations using a least-squares method:

$$\begin{bmatrix} x_1^2 & x_1 y_1 & y_1^2 & x_1 & y_1 \\ x_2^2 & x_2 y_2 & y_2^2 & x_2 & y_2 \\ \vdots & \vdots & \vdots & \vdots & \vdots \\ \vdots & \vdots & \vdots & \vdots & \vdots \\ x_n^2 & x_n y_n & y_n^2 & x_n & y_n \end{bmatrix} \begin{bmatrix} a \\ b \\ c \\ d \\ e \end{bmatrix} = \begin{bmatrix} z_1 \\ z_2 \\ \vdots \\ \vdots \\ z_n \end{bmatrix} \tag{9}$$

where $(x_i, y_i, z_i)$ is the coordinate of each point in the local coordinate system and n ($\geq 5$) is the number of points in the neighborhood.

Figure 5:
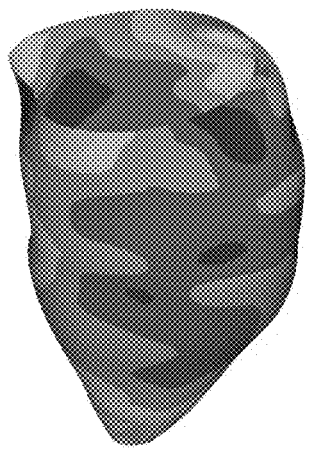
FIG. 5, which is composed of FIGS. 5(*a*) to 5(*d*), shows local and regional curvedness plots derived by the embodiment.
Figure 5:
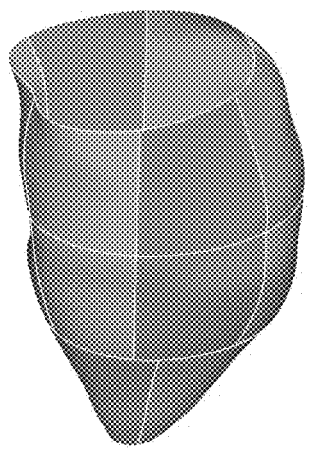
Figure 5:
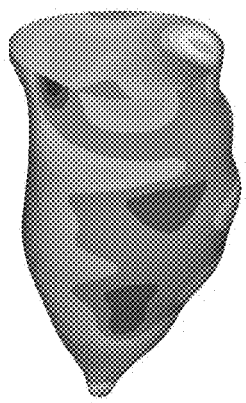
Figure 5:
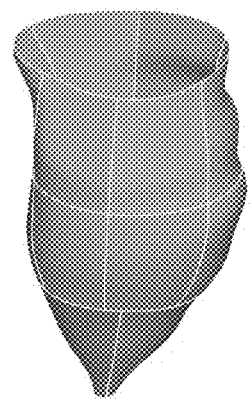
Figure 6:
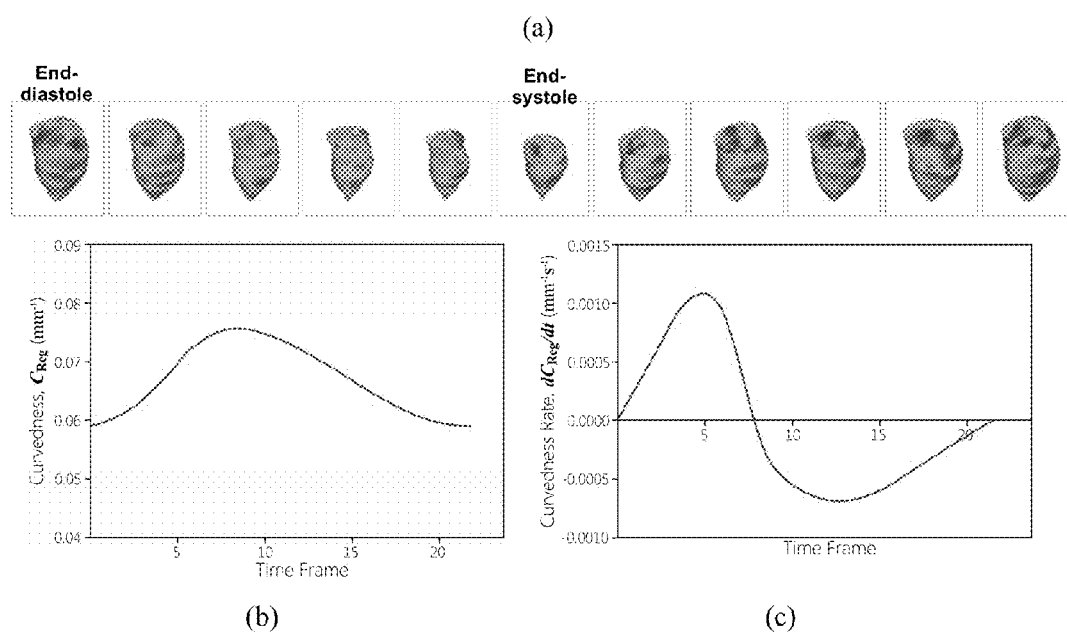
FIG. 6 is composed of FIG. 6(*a*) which illustrates ventricular geometry with curvedness mapping from end-diastole to end-systole, and FIGS. 6(*b*) and (*c*) which show computed curvedness and curvedness rates during cardiac cycle for a specific segment, as obtained by the embodiment.

After defining the quadric surface over each vertex, the associated Local Curvedness C can be calculated using $$C = \sqrt{\frac{\kappa_1^2 + \kappa_2^2}{2}} = \frac{1}{A^3}\sqrt{2B^2 - A^2(4ac - b^2)} \quad (10)$$

where $\kappa_1$ and $\kappa_1$ are the principal curvatures of the fitted surface at the vertex, and $A=\sqrt{d^2+e^2+1}$ and $B=a+ae^2+c+cd^2+bde$, such that a, b, c, d and e are the coefficients of the fitted quadric surface at the vertex. Note that this is a three-dimensional curvature value. The derivation is based on differential geometry theory. FIGS. 5(a) and (c) are black-and-white versions of color figures generated by the embodiment which show the local curvedness plots of two endocardial meshes at ED and ES, where the degree of curvedness is represented by a color value. FIG. 6(a) shows the local curvedness at a series of instants over the whole cardiac cycle.

4. Regional Curvedness Computation

The Regional Curvedness $c_{Reg}$ for each segment is the mean of the Local Curvedness C, of every vertex in that segment:

$$C_{Reg} = \frac{1}{m_\Omega} \sum_{i \in \Omega} C_i \quad (11)$$

where $\Omega$ is the set of vertices in the segment and $m_\Omega$ is the number of vertices in $\Omega$. FIGS. 5(b) and (d) are black-and-white versions of color figures generated by the embodiment which show the regional curvedness plots of the two endocardial meshes at ED and ES, where the degree of curvedness is represented by a color value. FIG. 6(b) shows the typical curvedness-time profile for any of the regions, i.e. it is a $c_{Reg}$ vs time plot.

5. Curvedness Rate Computation

The curvedness rate is the rate by which the shape changes, i.e., deformation or curvedness per time unit. This is equivalent to the instantaneous curvedness (or change in curvedness) per time unit:

$$dC/dt = \Delta C/\Delta t \quad (12)$$

The unit of curvedness rate is dimension/s. Eqn. 12 can be extended to give the curvedness rate for a given region, $dC_{Reg}/dt = \Delta C_{Reg}/\Delta t$. The curvedness rate of a normal healthy heart is positive during shortening and negative during relaxation and diastole The typical curvedness rate for one of the regions is shown in FIG. 6(c).

While the above illustrates the centre-difference method, in principle, we could use any method for finding gradients, be it discrete method such as finite difference or analytical method involving curve fitting.

Figure 7:
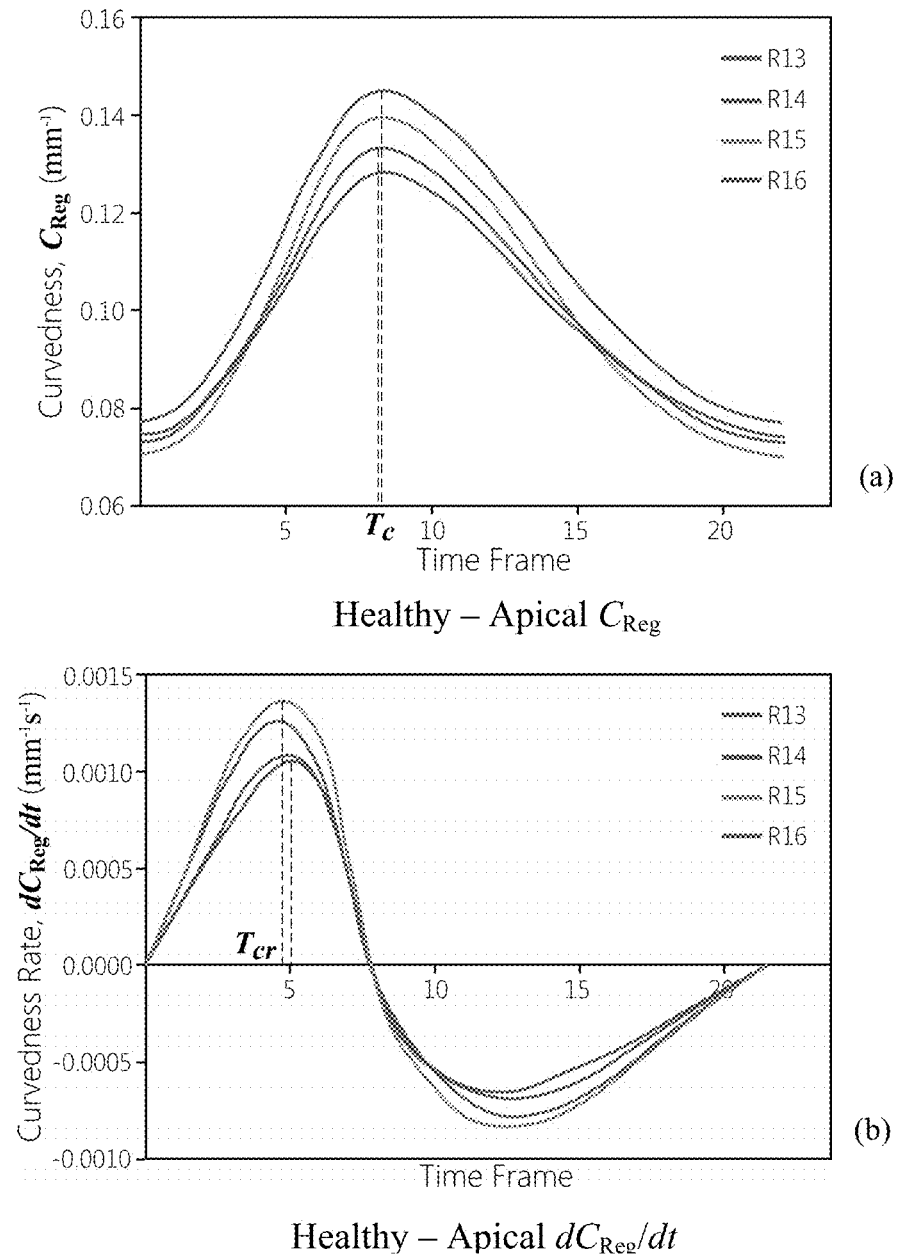
FIG. 7 is composed of FIG. 7(*a*) which is a plot of curvedness for four of the segments (regions) over time, and illustrates the time to maximal curvedness ($T_c$), and FIG. 7(*b*) which is a plot of the curvedness rate for four of the regions over time, and illustrates the time to maximal curvedness rate ($T_{cr}$)

FIG. 7(a) plots the value of $c_{Reg}$ against time for four of the regions, and FIG. 7(b) shows the corresponding $dC_{Reg}/dt$. The horizontal axis in FIG. 6(b)-(c) and FIGS. 7(a)-(b) represents time, and the dimensionless units correspond to the numbering of the time frames, corresponding to the time phases of MRI acquisition. Along the curvedness-time curve, various parameters are of clinical importance, such as any one or more of:

The maximal curvedness and curvedness rate (dC/dt)
The time to maximal curvedness ($T_c$) and time to maximal curvedness rate ($T_{cr}$)
Parameters for intra-ventricular dyssynchrony
  $T_c$-CV: Coefficient of variation of $T_c$ for 16 LV segment
  $T_{cr}$-CV: Coefficient of variation of $T_{cr}$ for 16 LV segment
  $T_c$-16: Maximal difference in $T_c$ between any 2 of 16 LV segments
  $T_{cr}$-16: Maximal difference in $T_{cr}$ between any 2 of 16 LV segments
  $T_c$-sep-lat: Maximal difference in $T_c$ between septal and lateral wall
  $T_{cr}$-sep-lat: Maximal difference in $T_{cr}$ between septal and lateral wall

INDUSTRIAL APPLICABILITY

Figure 8:
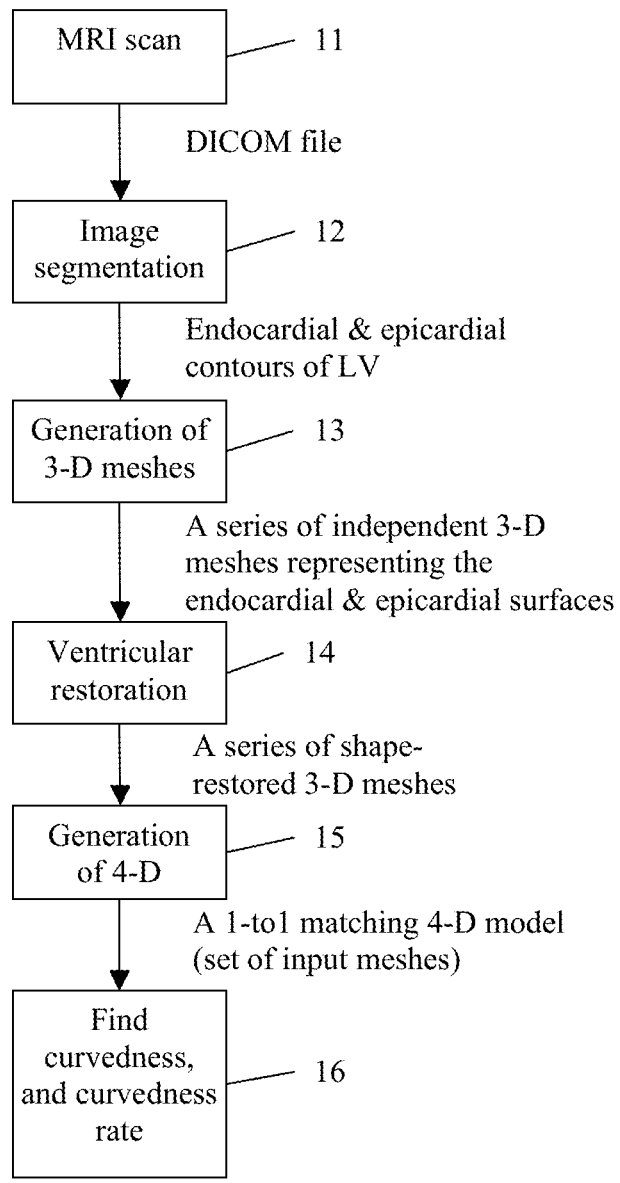
FIG. 8 is a diagram showing a process in which the embodiment can be used.

FIG. 8 shows a process in which the method of FIG. 1 can be used. In a first step 11, MRI data is collected, and stored in a DICOM file. In step 12, image segmentation is performed, to extract the endocardial and epicardial contours of the LV from the MRI image stored in the DICOM file. In step 13, 3-D meshes of the endocardial and epicardial surfaces are generated from the extracted endocardial and epicardial contours, respectively. This will generate a series of 3-D meshes representing the geometric configuration of the LV at each time instance, but these meshes are independent of one other (i.e., there is no 1 to 1 vertex correspondence). FIGS. 4(a) and 4(b) show the example of endocardial contour extraction and 3D endocardial reconstruction, respectively. In step 14, ventricular restoration is performed to correct misalignment in the data as a result of patient motion during scan. Details of this are given below. In step 15, the set of input endocardial meshes are mapped together, to form a 4-dimensional model. This is steps 1-2 of the process of FIG. 1. Step 16 of FIG. 8 is the generation of curvedness data and curvedness rate data, and is steps 3-5 of the process of FIG. 1.

Ventricular Restoration

Figure 9:
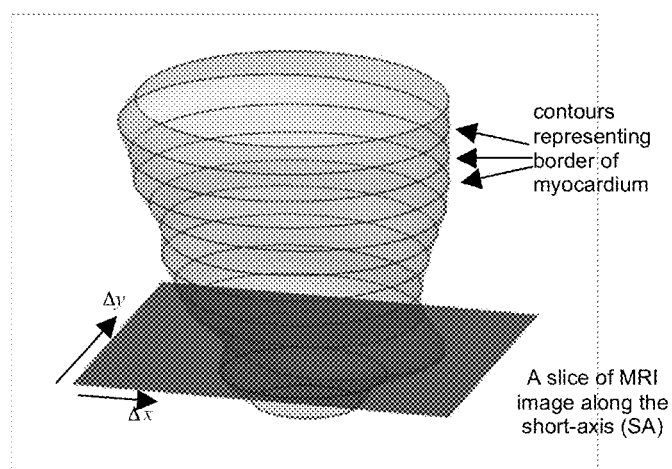
FIG. 9 illustrates a process, which may be used during a step of ventricular restoration, of progressively translating myocardial contours in the plane of their respective short-axis (SA)

Our method to ventricular restoration uses an optimization-based approach to modify the geometric configuration of a 3D LV mesh that has been affected by motion during image acquisition, with an aim to reduce the presence of geometrical kinks which are characteristic of motion artifacts. It comprises of a multi-step process involving a dual-resolution semi-rigid deformation, followed by a free-form geometric deformation. We formulated an effective objective function based on geometric derivatives extracted from the ventricular mesh to drive the optimization process. The input to our algorithm is an initial 3D LV mesh model $M=\{C_k | k=1, 2, 3 \ldots, N\}$ reconstructed from a set of contours $\{C\}$ representing the myocardial borders delineated from the short-axis (SA) planes, such that N is the total number of contours. Each contour $C_k=\{V_{k,i} | i=1, 2, 3, \ldots, m_k\}$ consists of a set of closed connected vertices $\{V\}$ where $m_k$ is the total number of vertices in the k-th contour. The convention used is such that the SA slices are parallel to the xy-plane; the contours are arranged from apex to basal region in increasing z-values; and the vertices in the contours are cyclic (i.e., $V_{k,m_k}$ is connected to $V_{k,l}$) since they represent a closed connected curve). In the semi-rigid deformation process, the shape restoration works by progressively translating the myocardial contours $\{C\}$ in the plane of their respective SA slice, as shown in FIG. 9.

Figure 10:
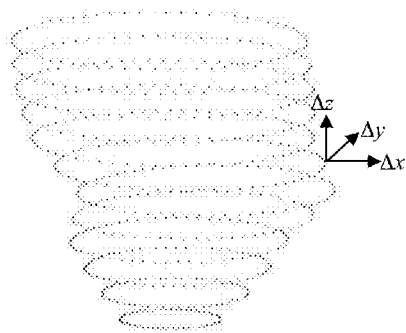
FIG. 10 illustrates progressively translating each individual vertex in the x-, y- and z-directions.
Figure 11:
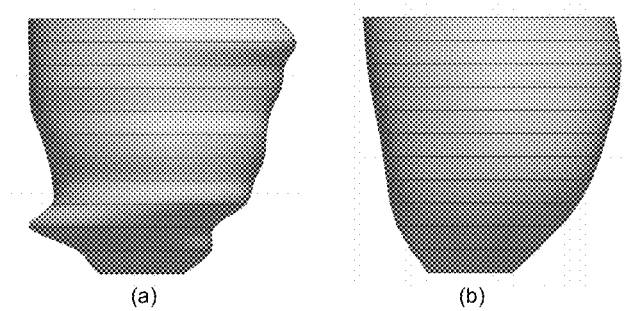
FIG. 11 shows three-dimensional left ventricle mesh models: (a) with motion artifacts, and (b) desired result after shape restoration.

In the free-form deformation process, the shape restoration is done by progressively translating each individual vertex in the x-, y- and z-directions, as shown in FIG. 10. FIG. 11(a) shows a reconstructed 3D LV mesh model from MRI data containing motion artifacts. We aim to achieve a smooth LV mesh, as shown in FIG. 11(b), by translating the contours and the vertices to the new positions using a quasi-Newton optimization algorithm, L-BFGS-B.

a) Objective Function

The method makes use of morphological knowledge of the LV to drive the shape restoration. Using the assumption that the LV epicardial surface must be smooth implies a surface with minimum concavity. From a geometric point of view, our objective is to find optimal translations for each individual slice, followed by optimal translation of each individual vertex such that the total concavity of the whole LV is at its global minimum. From a computation point of view, we can calculate the principal curvatures $\kappa_1$ and $\kappa_2$ for every point on the LV epicardial surface mesh to assess the amount of concavity or convexity of the surface. Therefore, in order to minimize the presence of geometrical kinks, the objective function F takes into account the summation of both $\kappa_1$ and $\kappa_2$ values of all points such that $$F = \sum_{i=1}^{m} \{\|\kappa_{1,i}\| + \|\kappa_{2,i}\|\,|\,\kappa_{1,i} < 0, \kappa_{2,i} < 0\} \tag{13}$$

where $\kappa_{1,i}$ is the maximum principal curvature and $\kappa_{2,i}$ is the minimum principal curvature at the i-th vertex, and m is the total number of vertices in the epicardial surface mesh. This will create a balance between concavity and convexity where geometrical kinks will be smoothed out but not at the expense of creating more kinks in other locations. This improves the overall smoothness in the LV shape.

In order to interrogate the geometrical properties of the LV epicardial surface mesh, we use a quadric fitting method to approximate the underlying geometry at every vertex of the mesh. A quadric surface S in 3D space can be expressed in the parametric form $$S(u, v) = \begin{bmatrix} u \\ v \\ au^2 + buv + cv^2 + du + ev \end{bmatrix} \tag{14}$$

where u and v are the surface parameters and {a, b, c, d, e} are the quadric coefficients. To fit S at a vertex p, we select a neighborhood around p which represents the region to which S is to be fitted. The extent of this neighborhood is quantified by an n-ring measure. The quadric coefficients of S are then obtained by solving a system of linear equations associated with the n-ring neighborhood using a least square method. The surface S approximates the local geometry in the vicinity of a point p on the 3D mesh model. In differential geometry, the curvature of a surface S(u,v) at a point p(u,v) is evaluated with respect to a normal section. This is done by constructing a plane $\pi$ such that it passes through the unit surface normal $\hat{n}$ and unit tangent vector in the direction of $\dot{\upsilon}$ (where $\dot{\upsilon}=[\dot{u}, \dot{v}]^T$). The intersection of $\pi$ with S results in a curve called the normal section. The normal curvature $\kappa(\dot{\upsilon})$ can be evaluated by $$\kappa(\dot{\upsilon}) = \frac{\dot{\upsilon}^T D \dot{\upsilon}}{\dot{\upsilon}^T G \dot{\upsilon}} \tag{15}$$

where $G =$ $$\begin{bmatrix} S_u \cdot S_u & S_u \cdot S_v \\ S_u \cdot S_v & S_v \cdot S_v \end{bmatrix} = \begin{bmatrix} E & F \\ F & G \end{bmatrix} \text{ and } D = \begin{bmatrix} S_{uu} \cdot \hat{n} & S_{uv} \cdot \hat{n} \\ S_{uv} \cdot \hat{n} & S_{vv} \cdot \hat{n} \end{bmatrix} = \begin{bmatrix} L & M \\ M & N \end{bmatrix}$$

are the first and second fundamental matrices of the surface, respectively.

The unit surface normal can be calculated by $$\hat{n} = \frac{S_u \times S_v}{|S_u \times S_v|} \tag{16}$$

In terms of the quadric coefficients, the equation to calculate the principal curvatures is $$\kappa_1 = \frac{B + \sqrt{B^2 - A^2(4ac - b^2)}}{A^3} \tag{17}$$

$$\kappa_2 = \frac{B - \sqrt{B^2 - A^2(4ac - b^2)}}{A^3}$$

where $A=\sqrt{d^2+e^2+1}$ and $B=a+ae^2+c+cd^2+bde$.

In order to achieve a solution whereby the LV epicardial surface's concavity is at its minimum, we formulate it as an optimization problem with a suitable objective function, i.e., $$\min \Sigma_{\forall vertices} \|\kappa_1\| + \|\kappa_2\| \text{ where } \kappa_1 < 0, \kappa_2 < 0 \tag{18}$$

The aim is to minimize this non-linear objective function using the L-BFGS-B algorithm which is adept at solving multivariate nonlinear bound constrained optimization problems. The algorithm is based on the gradient projection method and uses a limited-memory BFGS matrix to approximate the Hessian of the objective function. It does not store the results from all iterations but only a user-specified subset. The advantage is that it makes simple approximations of the Hessian matrices which are still good enough for a fast rate linear convergence and requires minimal storage. This makes it adept at solving large non-linear optimization problems with simple bounds on the variables.

In calculating the minimum $\kappa_2$, the selection of the n-ring to be used is important. The value of n-ring used in the quadric fitting affects the value of $\kappa_2$ because it determines how sensitive the method is to the effect of geometrical variation. With a bigger n-ring value, the shape of the surface over a larger extent is interrogated. This takes into account the general variation of the shape, ignoring the high frequency variation in the geometry. With a smaller n-ring value, the shape of the surface over a localized region is inspected. This captures the inter-slice variations in shape.

b) Dual-Resolution Semi-Rigid Deformation

To preserve the overall shape of the LV, such as its skewness, we perform the mesh restoration in two stages—the first stage involves a global resolution and the second involves a regional resolution. To set up the optimization problem, we can write Eqn. (13) as F(x) with n variables, such that x contains the centroid coordinates $(X_{C,k}, Y_{C,k})$ of the contour $c_k$, i.e., $$x = \begin{Bmatrix} x_1 & = & X_{C,1} \\ x_2 & = & X_{C,1} \\ x_3 & = & X_{C,2} \\ x_4 & = & X_{C,2} \\ \vdots & \vdots & \vdots \\ x_{n-1} & = & X_{C,N} \\ x_n & = & Y_{C,N} \end{Bmatrix}$$

Hence, the total number of variables in the optimization problem is twice the number of contours, i.e., n=2×N. Each of the variables $x_i$ in F(x) is subjected to the bounded-constraints $$lb_i \le x_i \le ub_i \; i=1,2,3,\ldots,n \quad (19)$$

where $lb_i$ and $ub_i$ are the lower and upper bounds of $x_i$, respectively.

In the semi-rigid geometric deformation process, the constraints on the translation distance of $(X_{C,k}, Y_{C,k})$ are set and the L-BFGS-B algorithm is used to solve the optimal translations in the xy-planes of all the SA slices of the LV mesh. The translation distances are constrained to translate within a bound of ±20 mm. This value is consistent with what was observed experimentally (expected to be in the range of 0 to 21 mm). The constraint on the translation in the x-direction is $$-20 \le X_{C,k}' - X_{C,k} \le 20 \quad (20)$$

where $X_{C,k}'$ is the solution and $X_{C,k}$ is the initial x-coordinate of the centroid position of the k-th contour. Similarly, the constraint on the translation in the y-direction is $$-20 \le Y_{C,k}' - Y_{C,k} \le 20 \quad (21)$$

The semi-rigid deformation process starts with performing the optimization at the global resolution using an n-ring setting of 5 in the computation of the objective function. When n-ring=5, $\kappa_2$ is calculated by taking into account points from 5 layers above and below the current SA slice, and 5 points to the right and left of the point of interest. All the slices will shift to minimize the objection function in Eqn. (1). Next, to further minimize surface concavity over a localized region, the intermediate mesh (updated with the previously obtained solution using n-ring=5) is subjected to a second pass of optimization at a regional resolution using n-ring=2. In this case, $\kappa_2$ is calculated by taking into account points from 2 layers above and below the current SA slice, and 2 points to the right and left of the point of interest. This second pass is essential to further minimize the concavity over a localized region. The optimal $(X_C', Y_C')$ are then used to update the mesh.

c) Free-Form Geometric Deformation

In the free-form geometric deformation process, our aim is to further minimize the concavity over a localized region by translating the position of vertices in the x-, y- and z-directions. In this process, the n-ring selected is 2 because we are performing a localized operation. Similarly, in order to set up the optimization problem, we can write Eqn. (13) as F(x) with n variables, such that x consists of the vertex coordinates $(X_V, Y_V, Z_V)$ of the mesh, i.e., $$x = \begin{Bmatrix} x_1 & = & X_{V_{1,1}} \\ x_2 & = & Y_{V_{1,1}} \\ x_3 & = & Z_{V_{1,1}} \\ x_4 & = & X_{V_{1,2}} \\ \vdots & \vdots & \vdots \\ x_{n-2} & = & X_{V_{N,mN}} \\ x_{n-1} & = & Y_{V_{N,mN}} \\ x_n & = & Z_{V_{N,mN}} \end{Bmatrix}$$

where the total number of vertices in the mesh is $$M = \sum_{k=1}^{N} m_k.$$

Hence, the number of variables in the optimization problem is thrice the number of vertices, i.e., n=3×M Again, each of the variables $x_i$ in F(x) is subjected to the bounded-constraints, as in Eqn. (19). The constraints in the x- and y-directions are determined by the distance between the vertex and its immediate neighboring vertices on the same slice/contour. More specifically, the constraint on the translation in the x-direction is $$-0.5|(X_{V_{k,i-1}} - X_{V_{k,i}})| \le X_{V_{k,i}}' - X_{V_{k,i}} \le 0.5|(X_{V_{k,i+1}} - X_{V_{k,i}})| \quad (22)$$

where $X_{V_{k,i}}'$ is the solution and $X_{V_{k,i}}$ is the initial x-coordinate of the position of vertex $V_{k,i}$. Similarly, the constraint on the translation in the y-direction is $$-0.5|(Y_{V_{k,i-1}} - Y_{V_{k,i}})| \le Y_{V_{k,i}}' - Y_{V_{k,i}} \le 0.5|(Y_{V_{k,i+1}} - Y_{V_{k,i}})| \quad (23)$$

Figure 12:
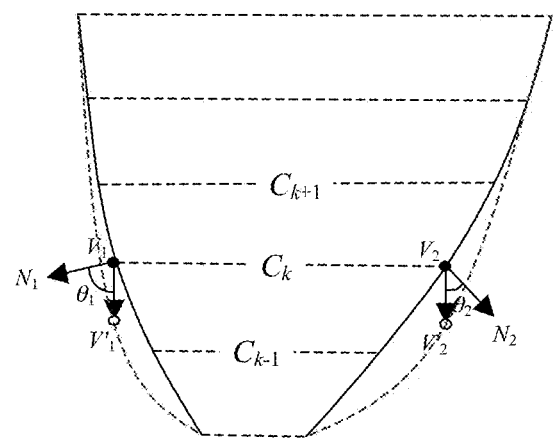
FIG. 12 shows the angle θ between vertex normal N and the z-axis, and the impact on volume change due to translation.

The constraint on the translation in the z-direction is determined by the inter-slice distance such that $$-0.5|(Z_{V_{k-1,i}} - Z_{V_{k-1,i}})| \sin\theta \le Z_{V_{k,i}}' - Z_{V_{k,i}} \le 0.5|(Z_{V_{k+1,i}} - Z_{V_{k-1,i}})| \sin\theta \quad (24)$$

where $|(Z_{V_{k-1,i}} - Z_{V_{k-1,i}})|$ is the original distance between contour $C_k$ and its lower adjacent contour $C_{k-1}$; $|(Z_{V_{k+1,i}} - Z_{V_{k-1,i}})|$ is the original distance between contour $C_k$ and its upper adjacent contour $c_{K+1}$; and $\theta$ is the angle between the vertex normal and the z-axis. In FIG. 12, we illustrate the impact of $\theta$ on the volume of the LV mesh with respect to the vertical shift of the vertices. Two vertices $V_1$ and $V_2$ on the same contour $C_k$ are such that $\theta_1 > \theta_2$. Given the same allowance of vertical shift such that their new positions become $V_1'$ and $V_2'$, we observed that the deviation of $V_2'$ from the original surface of the mesh is greater than $V_1'$, indicating that when $\theta$ is smaller, the resulting volume change due to vertical vertex shift is larger. Therefore, the $\sin\theta$ function in Eqn. (24) is used to constrain the vertices such that if there is greater deviation between the vertex normal from the SA plane (i.e., $\theta$ is small), the vertical translation in the z-direction will be less. This will prevent undesired substantial increase in the total volume of the restored mesh.

After the constraints on the translation distance $(X_V, Y_V, Z_V)$ are set, the L-BFGS-B algorithm is used to solve for the optimal translations of all the vertices of the LV mesh. The optimal $(X_V', Y_V', Z_V')$ are then used to update the mesh.

Figure 13:
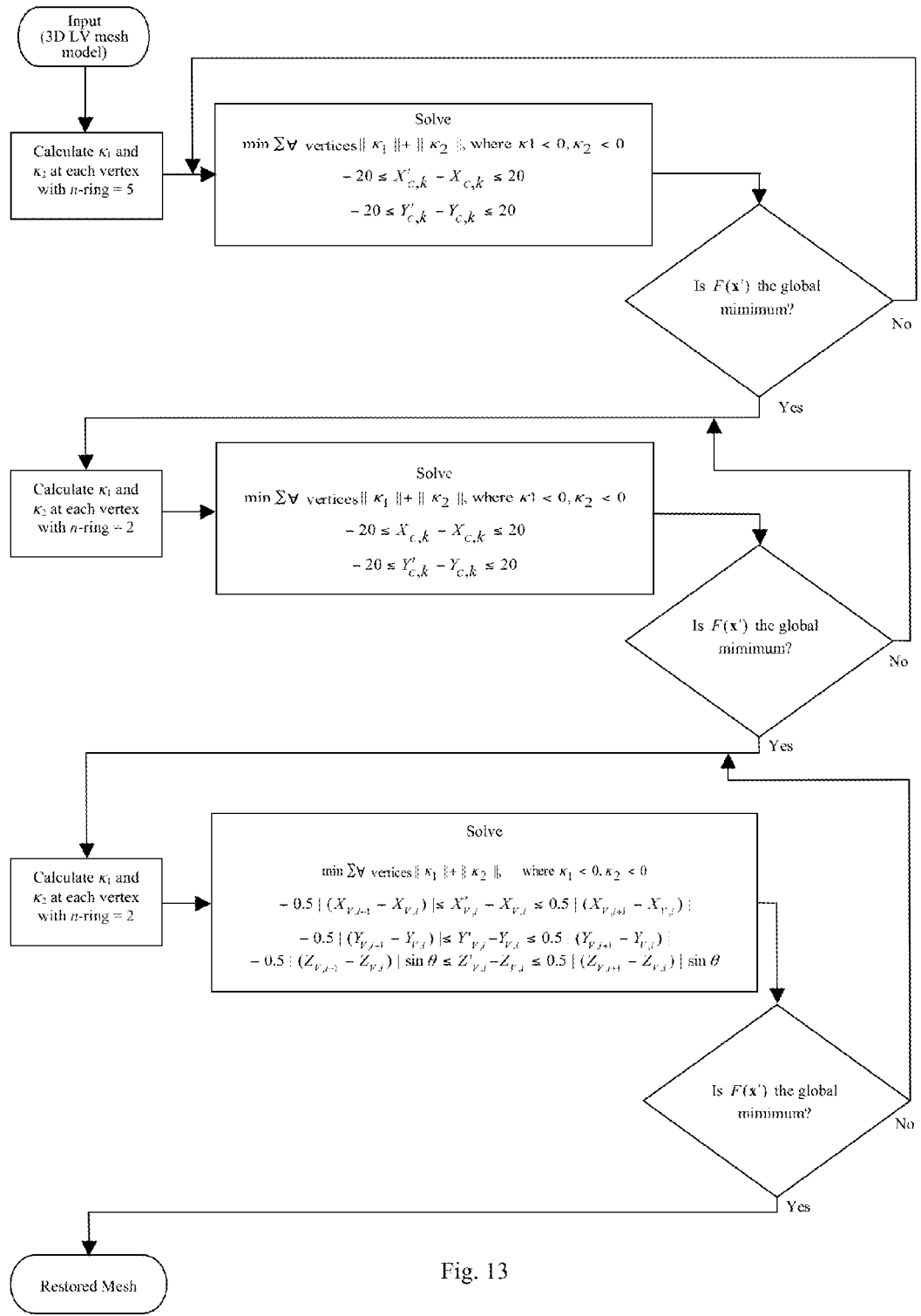
FIG. 13 is a flow chart of the ventricular restoration process.

The summary flow chart in FIG. 13 describes the multi-step restoration process. First the 3D LV mesh model is used as input and then $\kappa_2$ of each vertex is calculated. The objective function is formulated as given in Eqn. (13) and solved using the L-BFGS-B algorithm. The global minimum solution at the end of the process gives the configuration of the restored mesh. The modifications on the epicardial mesh applied by this restoration process are transferred to the endocardial mesh to generate a similar restoration effect. From the results, we observed that the shape restoration of the LV epicardial surface was successful. Visually, we verified that the asymmetry of the LV geometry was preserved while the geometrical kinks on the surface were significantly reduced. Quantitatively, the absolute values of $\kappa_1$ and $\kappa_2$ were reduced considerably after the shape restoration. Validation of results of our shape restoration technique with clinical results is important for the method to be accepted clinically. Registration methods are often validated using external markers or anatomical landmarks. However such validations are difficult because they are not readily available. In our work, we compared the mean contour displacement values of our method with those of existing image registration techniques and experimental studies and found that our results are consistent with those in the existing literature.

What is claimed is:

1. A computer-implemented method of obtaining data characterizing a biological structure having a periodic structure, the method employing a plurality of three-dimensional input meshes which represent an instantaneous shape of the biological structure at successive respective times within a cycle of periodic motion, the method comprising:

using the input meshes to form a set of three-dimensional morphed meshes, the morphed meshes having respective shapes which are the shapes of corresponding ones of the input meshes, wherein the operation of forming the morphed meshes comprises:

designating one of the input meshes, or a template mesh which is a geometric primitive, as a generic mesh, and for each of undesignated input meshes, forming a corresponding one of the morphed meshes by deforming the generic mesh to the shape of the respective one of the undesignated input meshes, wherein the morphed meshes have the same number of vertices as the generic mesh such that each vertex of each of the morphed meshes has a corresponding vertex in each of the other morphed meshes; and performing three-dimensional shape analysis comprising, for each of the morphed meshes, obtaining a curvedness value at each of a plurality of corresponding locations comprising corresponding vertices in the morphed meshes, and producing a value indicative of a change of curvedness per time unit using the curvedness values of the morphed meshes corresponding to the successive respective times, wherein the method further comprises restoring the shapes of the plurality input meshes to correct motion artifacts prior to forming the morphed meshes.

2. A method according to claim 1 in which, for each of the undesignated input meshes:

a plurality of feature points located on the generic mesh and a respective plurality of feature points located on the undesignated input mesh, are used to generate an affine transformation from the generic mesh to the undesignated input mesh.

3. A method according to claim 2 in which the feature points of the generic mesh and the feature points of the undesignated input meshes are found using landmarks having known positions on the generic mesh and undesignated input meshes.

4. A method according to claim 2 in which the affine transformation using radial basis functions (RBF).

5. A method according to claim 1 in which the shape analysis comprises fitting quadric surfaces over the vertices of the generic mesh and each morphed mesh, and computing geometrical parameters of the quadric surfaces.

6. A method according to claim 5 in which the fitting of the quadric surface is performed using a set of vertices spanning a portion of the corresponding mesh representing at least about 5% of the total area of the endocardial surface.

7. A method according to claim 1 in which, for each of a plurality of predefined segments of the biological structure, corresponding segments of the input meshes are found, each of said corresponding segments of the input meshes comprising multiple vertices of the input meshes, and said curvedness values comprise average curvedness values for each of said segments.

8. A method according to claim 7 in which the segments of the input meshes are found using landmarks having known positions in the input meshes.

9. A method according to claim 7 comprising obtaining for each region a regional curvedness rate which is a first time derivative of the curvedness for the region.

10. A method according to claim 1 in which the biological structure is the left ventricle (LV).

11. A computer system for obtaining data characterizing a biological structure having a periodic motion, the computer system having at least one processor and a data storage device storing program instructions, the program instructions being operative, upon being run by the processor, to cause the processor to:

form, from a plurality of input meshes which represent an instantaneous shape of the biological structure at successive respective times within a cycle of the periodic motion, a set of three-dimensional morphed meshes, the morphed meshes having respective shapes which are the shapes of corresponding ones of the input meshes, wherein the operation of forming the morphed meshes comprises:

designating one of the input meshes, or a template mesh which is a geometric primitive, as a generic mesh, and for each of undesignated input meshes, forming a corresponding one of the morphed meshes by deforming the generic mesh to the shape of the respective one of the undesignated input meshes, wherein the morphed meshes have the same number of vertices as the generic mesh such that each vertex of each of the morphed meshes has a corresponding vertex in each of the other morphed meshes; and perform three-dimensional shape analysis comprising, for each of the morphed meshes, obtaining a curvedness value at each of a plurality of corresponding locations comprising corresponding vertices in the morphed meshes, and producing a value indicative of a change of curvedness per time unit using the curvedness values of the morphed meshes corresponding to the successive respective times, wherein the method further comprises restoring the shapes of the plurality input meshes to correct motion artifacts prior to forming the morphed meshes.

12. A method of obtaining data characterizing a heart ventricle of a subject, the method comprising:

for each of a plurality of times of a cardiac cycle, scanning the heart ventricle to generate corresponding MRI data which image the ventricle at that time;

using the MRI data to obtain a border delineated ventricular contour for each corresponding time;

using each ventricular contour to generate a corresponding three-dimensional input mesh representing a shape of a ventricle at the respective time;

using the input meshes to form a set of three-dimensional morphed meshes, the morphed meshes having respective shapes which are the shapes of corresponding ones of the input meshes, wherein the operation of forming the morphed meshes comprises:

designating one of the input meshes, or a template mesh which is a geometric primitive, as a generic mesh, and for each of undesignated input meshes, forming a corresponding one of the morphed meshes by deforming the generic mesh to the shape of the respective one of the undesignated input meshes, wherein the morphed meshes have the same number of vertices as the generic mesh such that each vertex of each of the morphed meshes has a corresponding vertex in each of the other morphed meshes; and performing three-dimensional shape analysis comprising, for each of the morphed meshes, obtaining a curvedness value at each of a plurality of corresponding locations comprising the corresponding vertices in the morphed meshes, and producing a value indicative of a change of curvedness per time unit using the curvedness values of the morphed meshes corresponding to the successive respective times, wherein the method further comprises restoring the shapes of the plurality input meshes to correct motion artifacts prior to forming the morphed meshes.

13. A method according to claim 1 comprising generating a temporal profile of the curvedness values for the plurality of morphed meshes corresponding to the successive respective times, and producing the value using the temporal profile.

14. A computer system according to claim 11 comprising generating a temporal profile of the curvedness values for the plurality of morphed meshes corresponding to the successive respective times, and producing the value using the temporal profile.

15. A method according to claim 12 comprising generating a temporal profile of the curvedness values for the plurality of morphed meshes corresponding to the successive respective times, and producing the value using the temporal profile.

* * * * *